(12) United States Patent
Kuo et al.

(10) Patent No.: US 6,845,354 B1
(45) Date of Patent: Jan. 18, 2005

(54) INFORMATION RETRIEVAL SYSTEM WITH A NEURO-FUZZY STRUCTURE

(75) Inventors: Yau-Hwang Kuo, Tainan (TW); Jang-Pong Hsu, Tainan (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/392,572

(22) Filed: Sep. 9, 1999

(51) Int. Cl.[7] .............................................. G06F 17/27
(52) U.S. Cl. .............................................. 704/9; 707/6
(58) Field of Search ................... 704/1, 9, 10; 707/2–3, 707/4, 5–6, 104, 102; 715/531, 532–534

(56) References Cited

U.S. PATENT DOCUMENTS

| | | | |
|---|---|---|---|
| 5,642,502 A | * 6/1997 | Driscoll | 707/5 |
| 5,724,571 A | * 3/1998 | Woods | 707/5 |
| 5,933,822 A | * 8/1999 | Braden-Harder et al. | 707/5 |
| 5,956,711 A | * 9/1999 | Sullivan et al. | 707/6 |
| 6,101,491 A | * 8/2000 | Woods | 707/3 |

* cited by examiner

*Primary Examiner*—David D. Knepper
(74) *Attorney, Agent, or Firm*—Birch, Stewart, Kolasch & Birch, LLP (57) ABSTRACT

An intelligent information retrieval system for finding information components corresponding to an input query word. The system includes a synonym block for finding synonymous indexed keywords of the query word; an information indexing block for finding corresponding information components based on the indexed keyword; a component ranking-filtering block for ranking and filtering the found information components and outputting the desired information components being selected; a synonym adjusting block for adjusting the fuzzy mechanism of the synonym block based on the found information components; and a filtering adjusting block for adjusting the fuzzy mechanism of the ranking-filtering block based on the found information components. The aforementioned synonym block and information-indexing block are implemented by neuro-fuzzy networks for accelerating parallel processing and automatic learning. Further, the synonym block can tolerate input errors by way of query word encoding and position shift compensation.

22 Claims, 7 Drawing Sheets

INFORMATION RETRIEVAL SYSTEM WITH A NEURO-FUZZY STRUCTURE

BACKGROUND OF THE INVENTION

1. Field of the Invention

The present invention relates to an information retrieval system. More particularly, it relates to an information retrieval system with a neuro-fuzzy approach for building a customizable thesaurus, tolerating an operator's input errors, performing fuzzy queries, and providing a quick select option by prioritizing the information retrieved by the system according to the operator's preference.

2. Description of the Related Art

The rapid growth in the Internet and information industry has diversified the way information is retrieved. It has become crucial for an operator to effectively find the information of his or her interest. For example, a software programmer who develops software programs with object-oriented technology may hope to quickly assemble a prototype software application directly from the appropriate retrieved and developed software components and test it after acquiring the formal specification upon receipt of demands for large scale software development. Such demands also hold true in public library query system, World Wide Web search tools and other information services (such as the management and query of massive news archives and legal documents) where operators hope to get the desired information that meets their professional needs.

However, the exponential growth in information loads or software components included in software component libraries has led to uncertainty in the entire process of retrieving information and software components. Efficiency is normally contingent upon an operator's experience and expertise, that is, whether the query words the operator inputs precisely describe the features of the desired information. Consequently, information retrieval systems have become a critical issue in information management and information recycling technology.

Conventional information retrieval systems are constructed based on Boolean logic. That is, the query words entered by an operator are matched with specific keywords in the information or software components to determine whether they meet operator's needs. Such conventional information retrieval systems offer very limited flexibility and have the following drawbacks:

1. In a typical information retrieval system, the system normally expects the query words an operator enters upon accessing query libraries to fully match the keywords provided by the system. In other words, those keywords are formulated to describe the features of an information archive or software component when the system is built. However, in practice, it is nearly impossible to demand that operators precisely use the keywords stored in the system.

To tackle this problem, a thesaurus is created for keywords in the systems of the prior art. That is, each query word in the system is defined by a group of synonyms in the thesaurus. It can therefore be inferred that an input word is a query word when one of the synonyms is entered. However, a thesaurus as such generally adopts a rigid formula to list the correspondence between query words and synonyms.

2. In conventional information retrieval systems, it is assumed that query words entered by the operator should be accurate, i.e., conventional systems tolerate no erroneous input. Perfect accuracy cannot be guaranteed for routine input, and synonymous words with a different part of speech may be entered. For example, an operator may skip a character in typing a query word, or the operator may enter a noun form of the query word instead of the verb form as found in the thesaurus. Similar situations will prohibit the operator from finding a corresponding keyword.

To tackle this problem, prior art has created a replace table to make up the deficiency. The replace table lists occurrences of possible errors, declensions and inflections of the query words in the thesaurus to revise potential input errors the operator may make. However, this kind of replace table is quite rigid and basically unable to compensate for all possible errors.

3. Information retrieval systems of the prior art fail to process indefinite information, that is, fail to provide fuzzy query processing. In other words, the operator has to precisely specify various descriptors or features of the query for information archives or software components to obtain the desired information. That is to say, the operator has to have certain knowledge of the information document or software components to be queried; otherwise, the queried result from erroneous information will not fulfill expectations.

4. Lastly, a significant number of documents or software components can normally be retrieved for a specific keyword in conventional information retrieval systems. Generally, advanced information retrieval systems may find the correspondence between documents or software components and query words and output the ranking. Since the ranking-filtering functions are rigid, every operator has to follow the same ranking-filtering procedures. Consequently, no flexibility is provided in using the systems.

Current information retrieval systems, as specified above, can perform basic query and retrieval tasks; however, they are not conveniently accessible and have difficulty finding appropriate files or software components. And this problem is what this invention intends to resolve.

SUMMARY OF THE INVENTION

Therefore, the primary object of this invention is to provide an intelligent information retrieval system, where the thesaurus can be customizable according to the operator's preference and be queried according to the keyword the operator enters after performing the customizable conversion of synonyms.

Another object of this invention is to provide an intelligent information retrieval system that tolerates erroneous input. That is, the system can still proceed with a query even the operator has to some extent made mistakes.

Still another object of this invention is to provide an intelligent information retrieval system, which performs and processes indefinite data, that is, performs fuzzy query, to enhance the flexibility in usage.

And another object of this invention is to provide an intelligent information retrieval system capable of performing ranking of the retrieved software components according to operator's preference and performing filtering according to operator's settings, thereby enabling easy access and enhancing the system's function.

In accordance with the aforementioned objects, this invention provides an intelligent information retrieval system for querying the corresponding information components with an inputted query word. The system includes a synonym block for finding the correspondence of at least an indexed keyword according to the query word based on a fuzzy synonym mechanism; an information indexing block for finding at least an information component corresponding to the indexed keyword based on the aforementioned query word; a component ranking-filtering block for filtering and ranking the found information components based on a fuzzy ranking-filtering mechanism and for outputting the desired information components for selection; a synonym adjusting block for adjusting the fuzzy mechanism of the synonym block based on the selected information components; and a filtering adjusting block for adjusting the fuzzy mechanism of the component ranking-filtering block based on the selected information components.

This invention consists of information components independently packed for a specific task as aforementioned information components. In addition, the above synonym block and information indexing block are implemented by fuzzy neural networks for accelerating parallel processing. Also, the synonym block can tolerate input errors due to query word encoding and position shift compensation.

The aforementioned synonym block can perform in two phases, namely: recall phase and learning phase. In the recall phase, the synonym block encodes a query word with an encoding section to generate an encoded pattern of the query word to correspond with a feature of the query word. Further, a similarity section is used to match the encoded pattern of the query word with the encoded pattern of system synonyms to generate a corresponding similarity value representing the degree of similarity between the query word and those synonyms in the system. Those system synonyms correspond respectively to a plurality of keywords set in the system. Comparisons are made with the similarity value and the correlation value between the system synonyms and system keywords through a correlation section and a default threshold so as to select the output as the above-mentioned indexed keywords from those system keywords. In practice, however, the similarity calculation section can be composed of the nodes of a fuzzy neural network with each node corresponding to a synonym set in the system. The correlation section can be composed of nodes to correspond to each individual keyword set in the system.

In the learning phase, the synonym block generates respectively an encoded pattern of a query word and an encoded pattern of a retrieved component keyword for the query word and the retrieved component keyword corresponding to the selected information component through an encoding section. Next, the similarity calculation section matches respectively the encoded pattern of the query word and the encoded pattern of the retrieved component keyword with the encoded pattern of the system synonym to generate a first set of corresponding similarity values and a second set of corresponding similarity values. The correlation section calculates the corresponding output values based on the first and second sets of similarity values and the original correlation value between the system synonyms and the system keywords. Finally, the determining section is used to determine whether it should correct the aforementioned similarity calculation section and the correlation section according to the first set and the second set of similarity values and the above output value.

The aforementioned information indexing block includes an indexed keyword register section for sequentially storing the indexed keywords; and a plurality of component indexing units for corresponding to various information components and for storing the component keywords corresponding to the information components and the identification data of the corresponding information components. When an indexed keyword is received, its similarity to the saved component keyword is calculated, and it is judged whether a predetermined threshold is exceeded to determine whether the identification data of the corresponding information component should be outputted.

BRIEF DESCRIPTION OF THE DRAWINGS

The above objects, features and advantages of this invention will become apparent from the detailed description of a preferred embodiment with reference to the following drawings, wherein.

DETAILED DESCRIPTION OF THE PREFERRED EMBODIMENTS

The information retrieval system as disclosed in this embodiment is a system for retrieving software components. The software component mentioned here refers to source codes for a specific functions as well as private data used by the source codes, which are packed as independent components, such as the software components used in object-oriented technology for performing a function. However, application of this invention should not be limited to the environments as described in this embodiment since modifications of this embodiment involving, for example, environments in which multimedia data such as various documents, images, animated pictures and songs are retrieved, can still be made by those who are skillful in the art.

According to the above description of the prior art, the information retrieval system of this embodiment is provided to achieve the following objects by: Firstly, enabling the operator to customize the thesaurus for easy query according to personal habit and preference; secondly, tolerating input errors; thirdly, providing representation and processing of indefinite information; and fourthly, ranking the retrieved software components and filtering out those with low correlation according to operator's personal retrieval preference and habit for convenience in selection. The above objects of this invention are realized by making use of fuzzy information retrieval, knowledge engineering and machine learning technologies. The embodiment of this invention is described in further detail with reference to the accompanying drawings.

Figure 1:
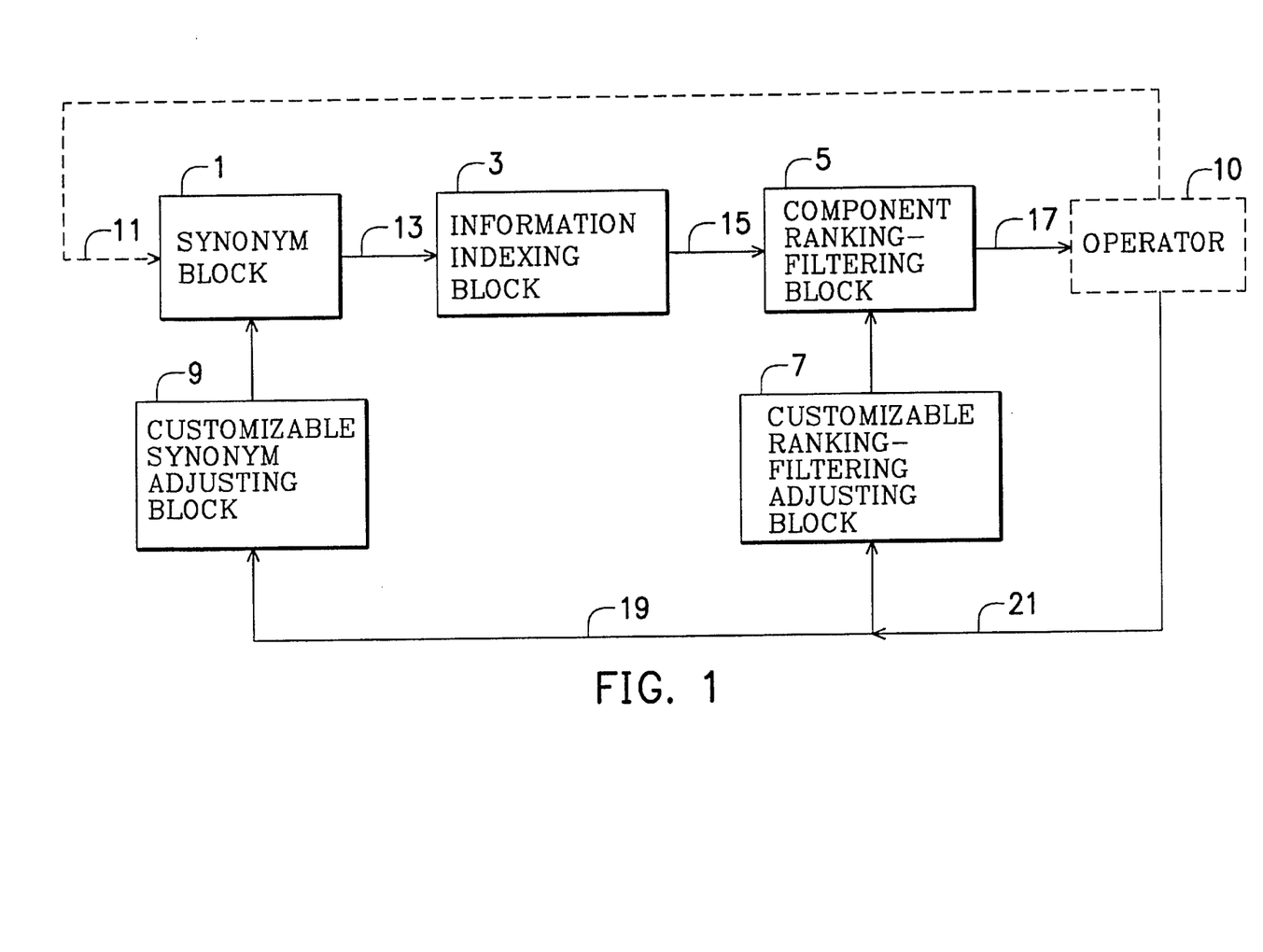
FIG. 1 is a block diagram illustrating the functional structure of an intelligent information retrieval system of this invention.

FIG. 1 is a block diagram illustrating the functional structure of an intelligent software component retrieval system of this invention. As shown in FIG. 1, the entire software component retrieval system is composed of synonym block 1, information-indexing block 3, component ranking-filtering block 5, customizable ranking-filtering adjusting block 7, and customizable synonym adjusting block 9. Functionally, the system is divided into two parts: the query retrieval mechanism comprising synonym block 1, information indexing block 3 and component ranking-filtering block 5 as shown in the upper section of FIG. 1, and the adjusting mechanism comprising customizable ranking-filtering adjusting block 7 and customizable synonym adjusting block 9 in the bottom section of FIG. 1.

In the process of query retrieval, the operator 10 first specifies a query word 11 to the synonym block 1 for finding corresponding keywords. The keywords are set in the system for specifying the characteristics of software components to be retrieved. In this embodiment, the query word 11 specified by the operator 10 includes four query facets for defining the software components to be retrieved by the operator. The four facets are software component function, software component file type, associated medium and system type, respectively. The operator can define the four facets for retrieving the desired software components. The query item of software component function is for defining the function and capability of the software components. In this embodiment, the query item for software component function accepts multiple query word input, which are divided by slashes. The query item for software component type is for defining the file type of the software components, such as OCX, VBX (visual basic), VCL, DLL (dynamic link library), C++, and delphi among others. The query item for associated medium is for defining a device used by a software component, such as disk, keyboard, input/output port, network, screen and interface. The query item for system type is for defining an appropriate operating platform for a software component, such as Windows 3.x/95/NT, DOS, OS/2, and UNIX, among others. In this embodiment, only the query item for the software component function is entered by the operator, other query items, which are in a fixed keyword table provided with the system, are for the operator to select.

Figure 2:
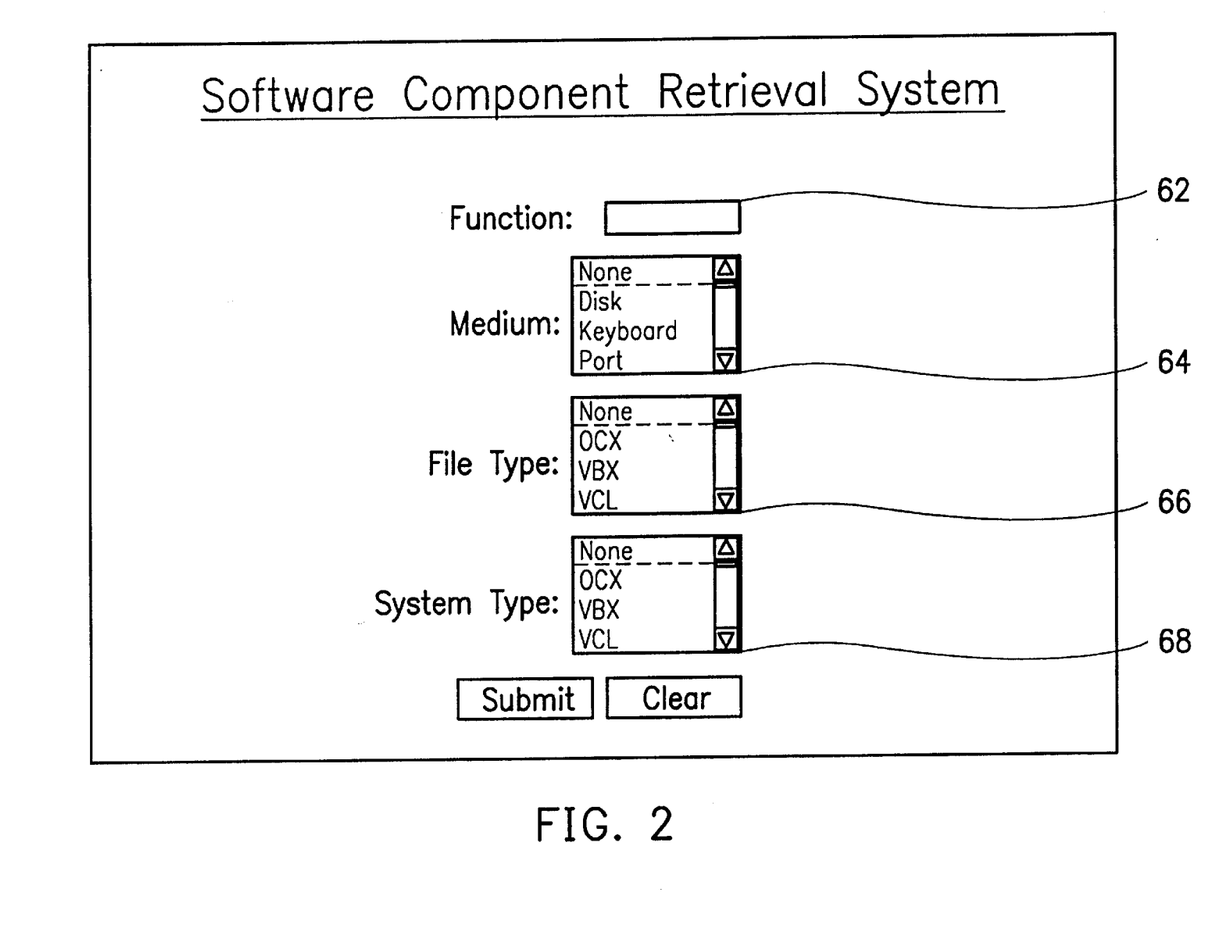
FIG. 2 is a schematic diagram illustrating an exemplary query screen of the intelligent information retrieval system of this embodiment.

FIG. 2 is a schematic diagram illustrating an exemplary query screen of the information retrieval system of this embodiment. As shown in the figure, the operator 10 can define the desired software components with settings for various query items, wherein 62 denotes a software component function, 64 an associated medium, 66 a file type and 68 a system type. It is clear from the figure that the operator can freely key in query words to define the function of the software components; other query items can be selected directly from the system keywords. Consequently, only the query words the operator enters in the function item will be processed for synonyms.

After a query word is entered into the synonym block 1 for synonymy analysis and processing, its corresponding keywords predefined by the system are called "indexed keywords" 13 in this embodiment. Indexed keywords belong to keywords predefined in the system and have a certain degree of synonymy with the entered query word. Such synonymy is defined by the synonym block 1. In this embodiment, the synonym block 1 comprises a fuzzy neural network and can tolerate input errors by virtue of query word encoding and position shift compensation. The detailed construction of the synonym block 1 will be explained later. Also, as described above, since the synonym block 1 of this embodiment only processes the synonyms for the query words in the function item of the software components, other query words entered in the query item will be directly selected from the keywords preset in the system, hence, problems associated with synonyms and input errors are eliminated.

The information-indexing block 3 performs the retrieval of software components based on the indexed keywords found in the synonym block 1. In this embodiment, the information-indexing block 3 will output an identification data 15 for a retrieved software component. Moreover, the information-indexing block 3 also comprises a fuzzy neural network and can enhance parallel processing efficiency. Detailed description follows.

Finally, the identification data of software component 15 outputted from the information indexing block 3 is supplied to the component ranking-filtering block 5 for ranking and filtering processing and outputted to the display device for the operator 10 to select. Generally, a significant number of software components that match the conditions set for the query word by the operator will be found for a query word after the processing in the synonym block 1 and the information indexing block 3. The number of indexed words that match the query word will increase with the burgeoning growth in the volume and field of software components. It will be deemed improbable for the a operator to easily find the desired software component from such a massive number of messages. Therefore, it is necessary to categorize and filter out the retrieved software components. The purpose of ranking processing is to sequentially display the retrieved software components according to the correlation with the query word and the operator's previous preference in selecting software components so the operator may find and select the desired software component as soon as possible. The purpose of filtering processing is to filter out software components with lower correlation so the operator may find the desired software components more easily. Consequently, a threshold may be modified and set by the operator in the component ranking and filtering block 5. The operator may then select the software components 21 he really needs from the displayed software components.

Another feature of the software component retrieval system of this embodiment lies in that an automatic feedback adjusting mechanism is provided for adapting the component ranking-filtering block 5 and synonym block 1, respectively, according to the retrieved components 21 and the keywords corresponding to the software components desired and selected by the operator 10, and the operating habit and retrieval preference the operator has demonstrated. Customizable ranking-filtering adjusting block 7 adapts according to the retrieved components 21 the ranking mechanism and filtering mechanism in the component ranking-filtering block 5 to make them learn to suit the needs of practical operations. Customizable synonym adjusting section 9 adapts according to software component keywords the synonymy in the synonym block 1 to make it learn to suit the needs of practical operations.

The synonym block 1, the information-indexing block 3 and component ranking-filtering block 5 are described in the following, respectively, with reference to the associative drawings.

Synonym Block (1)

Figure 3:
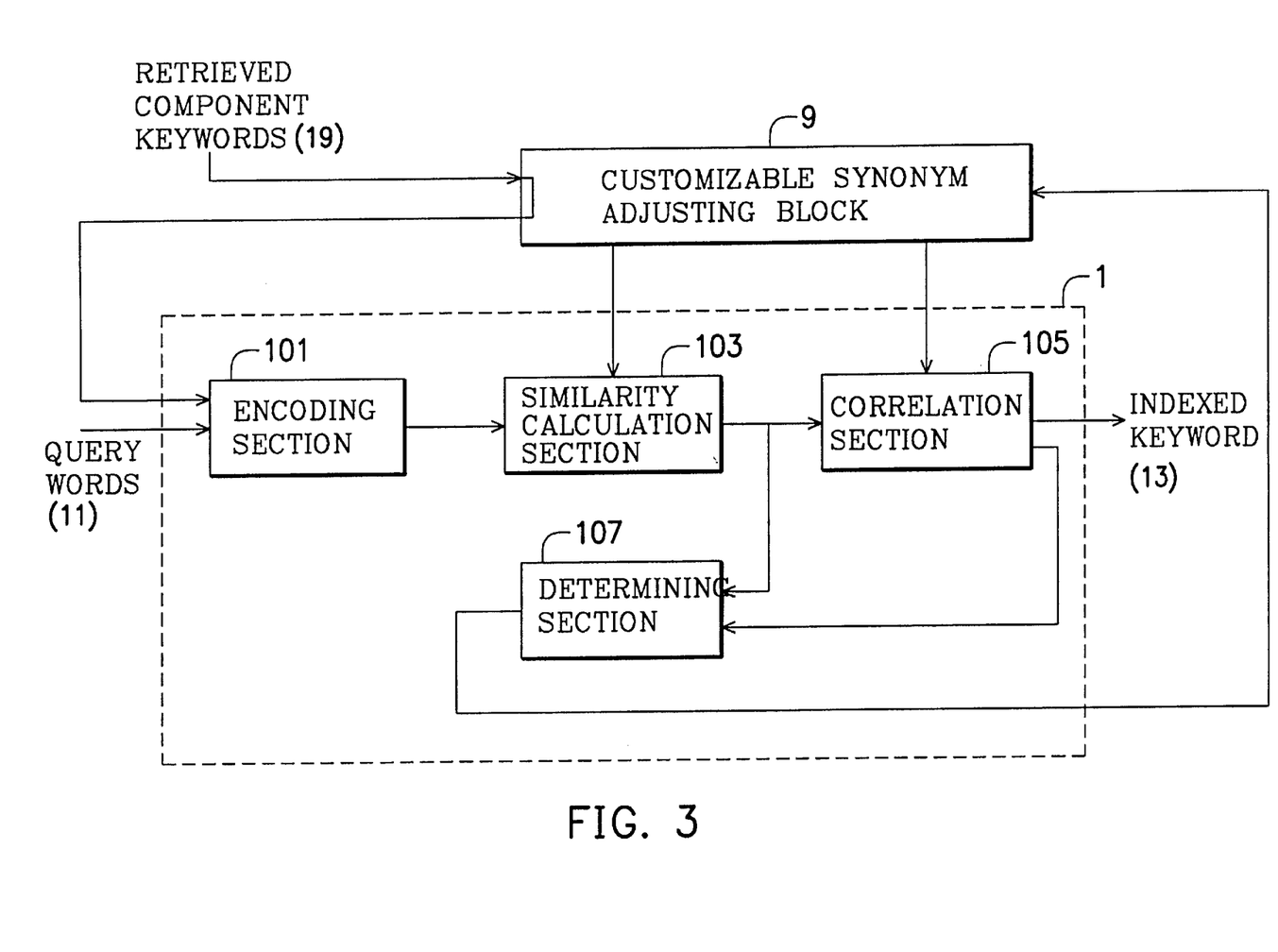
FIG. 3 is a block diagram illustrating the functional structure of the synonym block and customizable synonym adjusting section of the embodiment of this invention.

FIG. 3 is a block diagram illustrating the functional structure of the synonym block 1 and customizable synonym adjusting section 9 of the embodiment of this invention. As shown in the figure, the synonym block 1 comprises an encoding section 101, similarity calculation section 103, correlation section 105 and a determining section 107.

The synonym block 1 undergoes its operation in two phases: the recall phase and the learn phase.

Recall Phase

In the recall phase, the query word 11 the operator inputs is first encoded in the encoding section 101. In this embodiment, the encoding format displays in parallel the number of letters and the location of their first appearance with the word to be encoded (at this time, the query word). The encoding process of this embodiment is as follows:

(a) Convert first all letters in capital (upper) case into lower case, and all other characters other than a through z and space into spaces.

(b) Next, set 27 registers corresponding to the English alphabet a to z and the space.

(c) Further, calculate the number of each letter of the converted word to be encoded and save the number of these letters in their corresponding registers.

(d) By now, there are still some registers with empty data. Therefore, those empty registers can be used for saving the location of the first occurrence of each letter (including the space) being converted but remaining to be encoded. Saving is realized by calculating the corresponding location of each letter to be encoded and assigning it a negative value and then saving it in an empty register adjacent to the corresponding letter register, preferably, in the left register. If the left register is already filled with data, then the data will be saved in the right register. If both registers are filled with data, then the location value is abandoned.

(e) Though most registers are filled with location data, there are still some among these 27 registers that will remain empty. At this time, all letters being converted but not yet encoded (that is, letters a to z and the space) are sequentially inserted into all empty registers. Hence, the encoding of the words to be encoded is realized.

Figure 4:
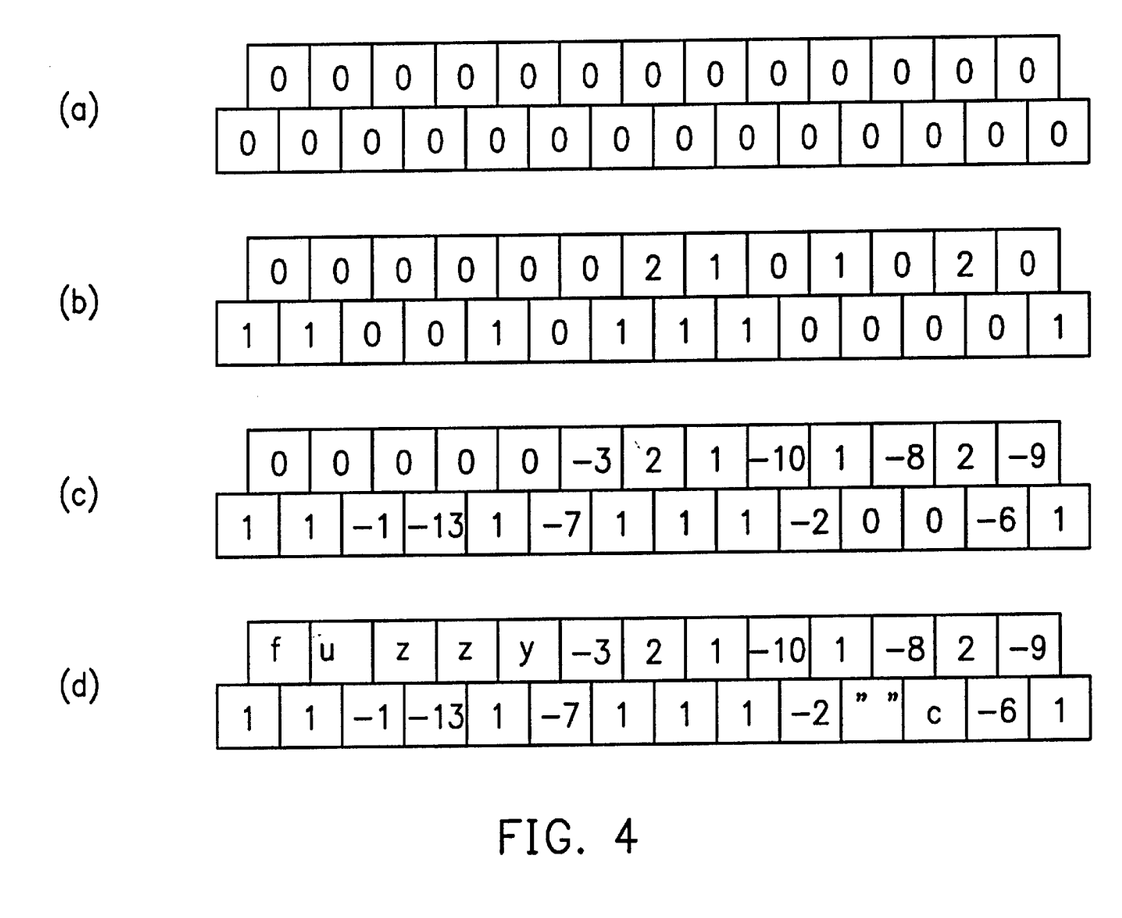
FIG. 4 is a schematic diagram illustrating an example of the encoding procedure of the embodiment.

FIG. 4 is a schematic diagram illustrating the encoding procedure of "fuzzy control" of this embodiment. The (a), (b), (c) and (d) in FIG. 4 represent the content of each register of the above steps (b), (c), (d) and (e), respectively. Therein, "0" represents empty data status, and the first 26 registers correspond respectively to letters "j," "e," "q," "i," "x," "a," "z," "r," "w," "t," "k," "o," "v," "n," "Sf," "s," "b," "l," "g," "c," "y," "u," "h," "p," "d," and "m". The $27^{th}$ register corresponds to the space. Such a distribution of letter locations follows the rule that most frequently used letter will be assigned to a location adjacent to the least frequently used letter based on the encoding features of the encoding section to increase the data recording capacity in the coding after the encoding.

The encoding format generated by the encoding section 101 will be supplied to the similarity calculation section 103 for calculating its similarity with system-defined synonyms and then forwarded to the correlation section 105 for determining what system keyword is relevant to the actual query word, the determined result being outputted as an indexed keyword.

The encoding format of system-defined synonyms are pre-saved in the similarity calculation section 103. Its encoding is in the same manner as described above. System-defined synonyms correspond to a specific system-defined keyword, the keyword is the word for directly describing the function of a software component (in this embodiment). Consequently, the query word 11 and system keyword are matched in the similarity calculation section 103 to generate a similarity value representing the degree of similarity between them.

The correlation value between system-defined synonyms and system-defined keywords is saved in the correlation section 105. For example, if the keyword for describing the function of a system-defined software component is "about dialog box," the synonyms may be "interface," "dialog," and "help" among others. From user experience, the above three synonyms differ in the degree of correlation with the actual keyword. For example, "dialog" may have a high correlation of 0.7 with "about the dialog box," the synonymy of "help box" with a lower correlation of 0.5, and "interface" with an even lower correlation 0.3 due to its broad meaning.

Consequently, the correlation between a query word and each keyword can be determined based on the correlation value between each synonym and an actual keyword after the similarity value being calculated by the similarity calculation section 103 is supplied to the correlation section 105. In this embodiment, the lesser of the corresponding similarity value and correlation value is taken to determine the correlation between the query word and each keyword and matched with a pre-determined threshold to further determine whether the keyword is to be outputted as an indexed keyword 13.

In the recall mode, the synonym block 1 will use neither the determining section 107 nor the customizable synonym adjusting 9. Also, the synonym block 1 further includes a position shift calculation section (not shown in FIG. 3, its function is realized in L2 node of FIG. 5) for providing the capability of tolerating input errors based on the encoding format of the query words 11 to be described later.

Learning Phase

In the learning phase, the synonym block 1 may make use of the functions provided by the customizable synonym adjusting section 9 to adjust the similarity value calculation parameters (to be described later) of the similarity calculation section 103 and the correlation value of correlation section 105. The adjustment is determined based on the software component chosen by the operator and its corresponding keyword 19 of the retrieved component.

First, the query word 11 and the retrieved component keyword 19 are inputted to the encoding section 101 for encoding so as to obtain the encoding format corresponding to the query word and the encoding format corresponding to the retrieved component keyword. The encoding format corresponding to the query word and the encoding format corresponding to the retrieved component keyword are further simultaneously supplied to the similarity calculation section 103 for calculating respectively the degree of similarity between the two and each system synonym. At this time, two sets of similarity value are generated to correspond the query word and the system synonym, respectively. The two sets of similarity values will be supplied to both the correlation section 105 and the determining section 107. However, at this time, the correlation section 105 executes the operation different from that in the recall phase, further generates another set of output values to the determining section 107. The determining section 107 will determine whether it should adjust and how it should adjust based on the similarity value and the output value of the two sets, further the adjustment is actually performed by the customizable synonym adjusting section 9.

The encoding of the encoding section 101 and the calculation of the similarity of the similarity calculation section 103 are performed in the same manner as those specified in the recall phase.

Figure 5:
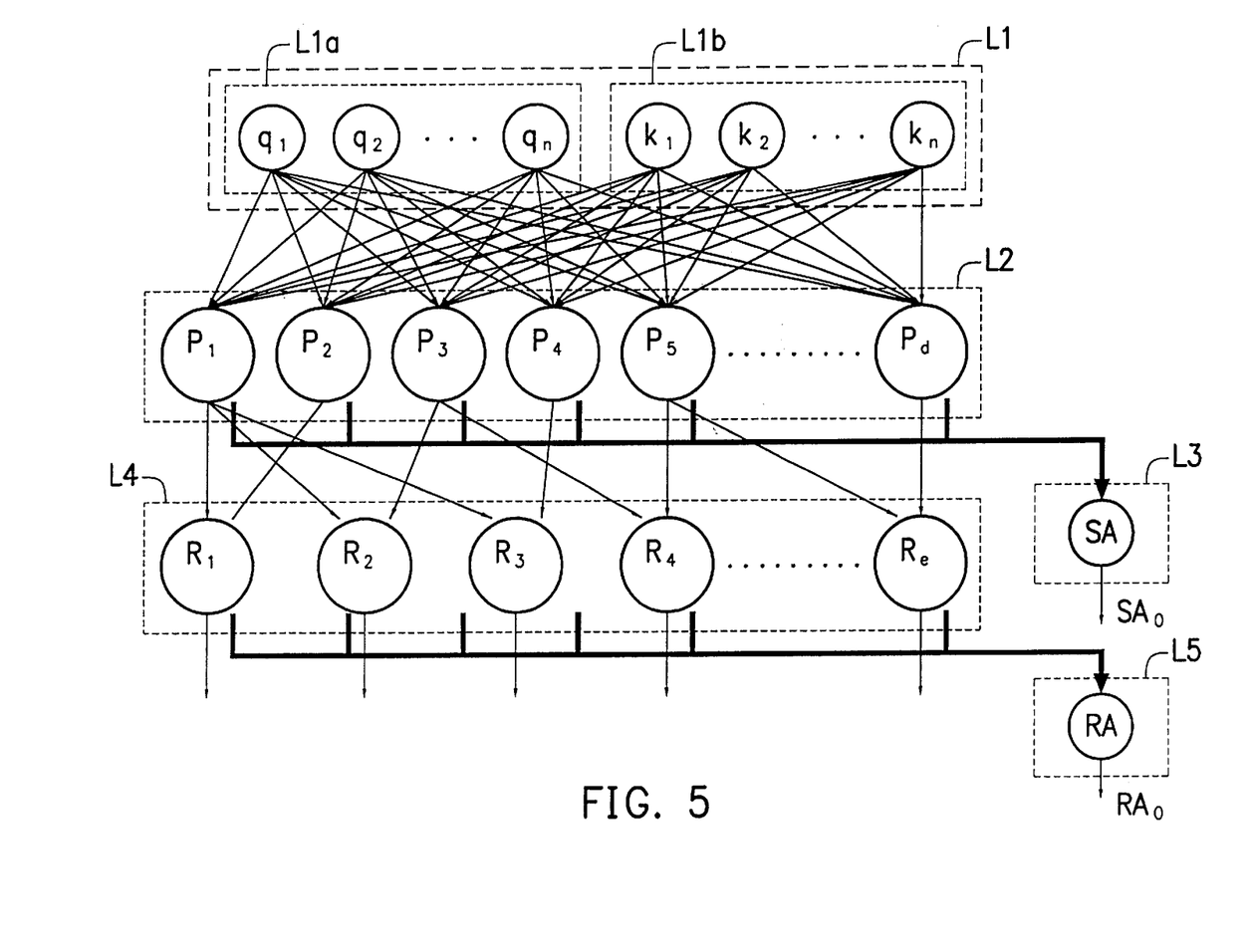
FIG. 5 is a diagram illustrating the detailed structure of a synonym block realized with the structure of fuzzy neural network of the embodiment of this invention.

FIG. 5 is a diagram illustrating the detailed structure of the synonym block realized with the structure of the fuzzy neural network of the embodiment of this invention. The fuzzy neural network provides advantages of parallel processing and learning capabilities. As shown in FIG. 5, the fuzzy neural network comprises nodes in five layers, represented as L1, L2, L3, L4 and L5, respectively. The function of the node of each layer is described in the following.

Layer L1

There are two sublayers for nodes on layer L1: L1a and L1b, each sublayer has n nodes. So sublayer L1a comprises nodes $q_1, q_2, \_, q_n$; and sublayer L1b comprises nodes $k_1, k_2, \_, k_n$.

Sublayers L1a and L1b are for storing query words 11 and the encoding format of the retrieved component keyword 19. Therefore, n in this embodiment is set to 27, and the function of nodes $q_1, q_2, \_, q_n$ and nodes $k_1, k_2, \_, k_n$ is to store query words 11 and the total number of each letter, the location of first appearance of each letter and actual alphabetical data in the retrieved component keyword 17. Encoded results of the encoding section 101 of FIG. 3 are saved in nodes of L1 layer, except for those actual performing modules (not shown).

Moreover, in the recall phase, only the data in every node of sublayer L1a are used, whereas in the learning phase, the data of nodes of both sublayers L1a and L1b are used.

Layer L2

The L2 layer comprises nodes $P_1, P_2, P_3, P_4, P_5, \_,$ and $P_d$ for corresponding to each system-defined synonym, respectively, and hence, also for storing the encoding format of the system synonym. Each node receives from layer L1 the encoding formats of query word 11 and the retrieved component keyword 19. In the recall phase, the similarity value between both the encoding format of the query word 11 and the encoding format of the retrieved component keyword 19 is calculated; whereas in the learning phase, the similarity values between the encoding format of system synonym and the encoding format of the query word 11 and the encoding format of the retrieved component keyword 19 are calculated, respectively. The similarity value represents the degree or extent of similarity between the input word (query word 11 or the retrieved component keyword 19) and the system synonym. Moreover, input errors can be detected through the position shift amount calculated with the nodes of layer L2 to compensate the encoding format of the inputted query word 11.

In this embodiment, each node of layer L2 performs the following calculations:

$$s(q, P_i) = \sum_j \{\hat{W}_{ij} b_{ij}\} \bigg/ \min\left(\sum_j \{\hat{W}_{ij} q'_j\}, \sum_j \{\hat{W}_{ij} P'_{ij}\}\right) \quad (1)$$

$$d(q, P_i) = \|q - P_i\| = \sum_j \{\tilde{W}_{ij} d_{ij}\} \bigg/ \sum_j \{\tilde{W}_{ij} (P''_{ij} + q_j)/2\} \quad (2)$$

$$\mu(q, P_i) = (1 + (d(q, P_i)/F_d)^{F_e})^{-1} \quad (3)$$

Equation (1) denotes the position shift amount $s(q, P_i)$ between the synonym ($P_i$) and the inputted query word 11 (q) saved in a node ($P_i$) of the layer L2. Wherein, $q_j$ and $P_{ij}$ represents the encoding format of query word q and the encoding format of synonym $P_i$, j is a number between 1 and 27. $\hat{W}_{ij}$ represents a weight between the $j^{th}$ node ($q_j$) of the layer L2 and the $j_{th}$ data item of the $i^{th}$ node $P_i$ of the layer L2 and can be considered as the importance of the $j^{th}$ encoded data item of the query word 11. Generally, such importance can be represented with the probability of the occurrence of a specific letter. For example, letter "z" only seldom appears in query words; therefore, it will become more important if it shows up, and should be more heavily weighted.

Please take note that equation (1) only calculates the negative value of the encoding format, i.e., calculates only when both $q_j$ and $P_{ij}$ are negative. Therefore, in equation (1), if $q_j$ is negative, then $q_j'$ equals 1 or 0; if $p_{ij}$ is negative, then $p_{ij}'$ equals 1 or 0; if $q_j$ and $p_{ij}$ are negative, then $b_{ij}$ equals $q_j$-$P_{ij}$ or 0. When the position shift amount s (q, $P_i$) is calculated to have a value equal to or greater than 1 or smaller than or equal to –1, all position information with a negative value for the encoding format q needs to be compensated with (by deducting or adding) this shift value.

The position shift amount s (q, $P_i$), calculated with the encoding format and equation (1), can check for missing character in inputting the query word. For example, if the operator intends to key in "fuzzy" as the query word but misses the first letter by keying in "uzzy" instead. It will be found that the position shift amount is greater than or equal to 1 when the shift is calculated and this shift amount denotes that there is a letter missing in the front, so the shift amount is compensated to the position amount of the format after encoding and the problem associated with the missing letter in front of the inputted query word is then resolved. Therefore, input errors will be reduced by making use of the fuzzy mechanism and encoding format of this embodiment.

Equation (2) denotes the average Hamming distance between a query word q and a synonym $P_j$. The three symbols $d_{ij}$, $P_{ij}$, and $q_j$ need to be explained here. Heretofore, the three sets are defined first: $S_n$ is a set of possible values of various letters recorded in an encoded pattern of a word, a set with a positive integer value smaller than 27; $S_p$ is a set of values with a negative integer value larger than –27 for recording the location where each letter displays for the first time in an encoded pattern of a word; and $S_c$ is a set for recording each letter in an encoded pattern of a word, a set of ASCII values larger or equal to 32. So there are four possible values for $d_{ij}$; value 1, the absolute value of $q_j$, the absolute value of $P_i$ and finally, the absolute value of $q_j$-$P_{ij}$, as shown in the following:

$$d_{ij} = \begin{cases} 1 & \text{if } (q_j \in S_p \text{ and } (P_{ij} = 0 \text{ or } P_{ij} \in S_c)) \text{ or} \\ & (q_j = 0 \text{ and } (P_{ij} \in S_p \text{ or } P_{ij} \in S_c)) \text{ or} \\ & (q_j \in S_c \text{ and } (P_{ij} = 0 \text{ or } P_{ij} \in S_p)) \text{ or} \\ & (q_j \in S_p \text{ and } P_{ij} \in S_p \text{ and } q_j \neq P_{ij}) \text{ or} \\ & (q_j \in S_c \text{ and } P_{ij} \in S_c \text{ and } q_j \neq P_{ij}) \\ |q_j| & \text{if } (q_j \in S_n \text{ and } (P_{ij} \in S_p \text{ or } P_{ij} \in S_c)) \\ |P_{ij}| & \text{if } (P_{ij} \in S_n \text{ and } (q_j \in S_p \text{ or } q_j \in S_c)) \\ |q_j - P_{ij}| & \text{otherwise} \end{cases}$$

Moreover, $P_{ij}''$ may have three possible values, as shown in the following:

$$P_{ij}'' = \begin{cases} P_{ij} & \text{if } P_{ij} \in S_n \\ 1 & \text{if } (P_{ij} \in S_p \text{ or } P_{ij} \in S_c) \\ 0 & \text{otherwise} \end{cases}$$

Also, $q_j$ may have three possible values, as shown in the following:

$$q_j'' = \begin{cases} q_j & \text{if } q_j \in S_n \\ 1 & \text{if } (q_j \in S_p \text{ or } q_j \in S_c) \\ 0 & \text{otherwise} \end{cases}$$

Equation (3) calculates the similarity between the two according to the average Hamming distance, wherein Fd and Fe represent two respective fuzzifiers, which define the range covered in the membership function of the average Hamming distance between patterns after encoding and the sensitivity to the average Hamming distance. Therefore, the similarity value $\mu_i$ (q,$P_i$) of a query word to a corresponding synonym can be generated.

The calculation of the similarity value for query words 11 as described above can also be applied to the calculation for retrieving component keywords 19. Moreover, the function of nodes of the L2 layer corresponds to the similarity calculation section 103 of FIG. 3.

Layer L3

Layer L3 includes a node SA. Node SA is used for finding a similarity value that is most similar to the input query word 11 among all values supplied from all nodes of layer L2. In this embodiment, node SA functions principally in the learning phase, its operation is represented as follows:

$$\mu(K, P_w) = \bigotimes_i \mu(K, P_i) \qquad (4)$$

where K denotes a query word 11 or a retrieved component keyword 19. $\hat{X}$ denotes an aggregation function, or the max function in this embodiment. $\mu(K,P_w)$ denotes the similarity output for node of layer L2 corresponding to the synonym found most similar to K. Also in this embodiment, the output SA of node $SA_O$ is a vector comprising another pair of nodes w of layer L2 most similar to the query word 11 and the retrieved component keyword 19 in addition to a pair with a value most similar to the query word 11 and the retrieved component keyword 19, as mentioned above.

Layer L4

Layer L4 comprises nodes $R_1$, $R_2$, $R_3$, $R_4$, —, $R_e$ to respectively correspond to system-defined keywords. As described above, a system keyword may correspond to several system-defined synonyms, each of which having a different correlation to the system keyword. Nodes of layer L4 determine the correlation between the input query word 11 and system-defined synonyms according to the similarity value calculated in aforementioned layer L2 (corresponding to each individual system synonym) and the correlation value corresponding to each individual node of layer L2. In this embodiment, the correlation between the query word 11 and the keywords can be determined by the maximal similarity value (that is, most similar synonym) and its minimal corresponding correlation value. Next, each node of layer L4 is set with a threshold $\theta_2^i$ (i represents an index or indicator of L4 node) to determine whether the query word 11 and its corresponding system keywords meet the requirement. If the requirement is met, then the L4 node can output the corresponding keyword as an indexed keyword 13 to the information-indexing block 3.

Each L4 node has different operative characteristics in the recall phase and the learning phase. In the recall phase, the min operation is executed once, whereas the min operation is executed twice in the learning phase. The operation performed by each L4 node is represented as follows:

$$\mu(R_i) = \min(\mu(q,P_{p1}),\check{W}^i) \qquad (5)$$

$$O_R(R_i) = \begin{cases} L_R(R_i) & \text{if } \mu(R_i) \geq \theta_2^i \\ \text{Null}, & \text{otherwise} \end{cases} \qquad (6)$$

$$O_L(R_i) = \min(\min(\mu(q,P_{p1}),\check{W}^i),\min(\mu(k,P_{p2}),\check{W}^i)) \qquad (7)$$

Therein, equations (5) and (6) are performed in the recall phase and equation (7) in the learning phase. In equation (5), $\check{W}_i$ represents the correlation with the $i^{th}$ synonym of layer L4. $R_i$ denotes the $i^{th}$ node of layer L4, and $p_1$ and $p_2$ represent a respective synonym with the node of layer L4, that is, with the $i^{th}$ L4 node connecting to L2 nodes $p_1$ and $p_2$. Q is an encoded pattern of the query word 11, k an encoded pattern of the retrieved component keyword 19. The correlation between the query word and the related keyword can be obtained with equation (5).

In equation (6), $L_R$ represents the identification data of system keyword to indicate an actual word rather than its encoding format. Further, threshold $\theta_2^1$ can be set by the operator for processing in a broader term, narrower term or normal term. That means, the smaller the threshold $\theta_2^1$ value, the broader the term used for processing; the greater the threshold $\theta_2^1$ value, the narrower the term used for processing. In equation (7), $O(P_1)$ and $O(P_2)$ represent a respective output value of nodes of L2 layer relevant to nodes of L4 layer.

Finally, $O_R$ ($R_i$) and $O_L$ ($R_i$) represent a respective output of nodes of layer L4 in the recall phase and learning phase supplied respectively to the information indexing block 3 and layer L5. Layer L4 corresponds to the correlation section 105 of FIG. 3.

Layer L5

Layer L5 comprises only a node RA and receives input from every node of layer L4 in the learning phase. The function of node RA is to select the maximal output $RA_O$ from correlation (co-dependency procedure) outputs of each node of layer L4. Its action can be illustrated as follows:

$$RA_O = \max(\mu(R_i)), i=1, \ldots, e \qquad (5)$$

In this embodiment, layer L5 and layer L3 are in the learning phase, and determine whether any adjustment is necessary or how the adjustment will be made. As described above, in this embodiment, layer L3 outputs at least two maximal similarity values corresponding to the query word 11 (with encoded pattern q) and the retrieved component keyword 19 (with encoded pattern k), respectively. Layer L5 then outputs an output with the greatest value. Customizable synonym adjusting section 109 can perform adjustment with these three values and two independently set thresholds $\theta_3$ and $\theta_1$.

(Case 1)

When the output of node RA(L5) is greater than the threshold $\theta_1$, or both of the two output similarity values of node SA(L3) are greater than the threshold $\theta_1$, then execute the following learning procedures:

(a) Modify system encoded patterns $P^{W1}$ and $P^{W2}$ saved in the two corresponding nodes (set as $W_1$ and $W_2$) with maximal similarity values of layer L2. Modification is performed as follows, where $\check{N}^{W1}$ and $\check{N}^{W2}$ represent a respective number of variations being made.

$$P_i^{w1} = \check{N}^{w1}/(\check{N}^{w1}+1) \cdot P_i^{w1} + 1/(\check{N}^{w1}+1) \cdot q_i$$

$$P_i^{w2} = \check{N}^{w2}/(\check{N}^{w2}+1) \cdot P_i^{w2} + 1/(\check{N}^{w2}+1) \cdot k_i \qquad (9)$$

$$\check{N}^{w1} = \check{N}^{w1}+1$$

$$\check{N}^{w2} = \check{N}^{w2}+1$$

where i=1□.

(b) Create a new L4 node w3 when the output value of the node RA(L5) is smaller than the threshold $\theta_3$, wherein the correlation values being saved and the initial value of variations are set respectively as:

$$\check{W}^{w3} = 1.0 \qquad (10)$$

$\check{N}^{w3}=1$

Otherwise, the correlation value $\check{W}^{w3}$ 3 saved in the node of layer L4 with the maximal output from min operation of L4 layer will be modified as positive learning. Modifications are performed as follows, where $\check{N}^{w3}$ represents the number of variations.

$\check{W}^{w3}=\check{N}^{w3}/(\check{N}^{w3}+1)\cdot\check{W}^{w3}+1/(\check{N}^{w3}-1)\cdot 1.0$ $\check{N}^{w3}=\check{N}^{w3}+1$ \hfill (11)

(c) Output in the recall phase a node of layer L4 with a value other than the maximal value in later L4. Assume the correlation value saved in the node to be $\check{W}^r$, and $\check{N}^r$ to represent the number of variations, the modification, known as negative learning, is performed as follows:

$\check{W}^r=(\check{N}^r+b+1)\cdot\check{W}^r+1/(\check{N}^r+b+1)\cdot O_R(R_i)$ $\check{N}^r=\check{N}^r+1$ \hfill (12)

where b represents a bias for preventing the correlation value from being greatly reduced in negative learning in the initial several learning processes.

(Case 2)

When the output of node RA(L5) is smaller than the threshold $\theta_3$, then execute the following learning procedures:

(a) Create a new L2 node w1 when the output with the maximal similarity value of the node RA(L2) to the query word 11 (with encoded pattern q) is smaller than the threshold $\theta_1$, wherein the encoded patterns being saved and the initial, value of variations are set respectively as:

$P_i^{w1}=q_i, i=1, \ldots, n$ $\check{N}^{w1}=1$ \hfill (13)

(b) Create a new L2 node w2 when the output with the maximal similarity value of the node RA(L2) to the retrieved component keyword 19 (with encoded pattern k) is smaller than the threshold $\theta_1$, wherein the encoded patterns being saved and the initial value of variations are set respectively as:

$P_i^{w2}=k_i, i=1, \ldots, n$ $\check{N}^{w2}=1$ \hfill (14)

(c) Create a new L4 node w3, wherein the correlation value being saved and the initial value of variations are set respectively as:

$\check{W}^{w3}=1.0$ $\check{N}^{w3}=1$ \hfill (15)

It has become evident from the above description of the synonym block 1 and the customizable synonym adjusting section 9 that the information (software component) retrieval system of this embodiment is able not only to dynamically adjust the structure of the synonym procedure, but also tolerate input errors.

Information Indexing Block (3)

Figure 6:
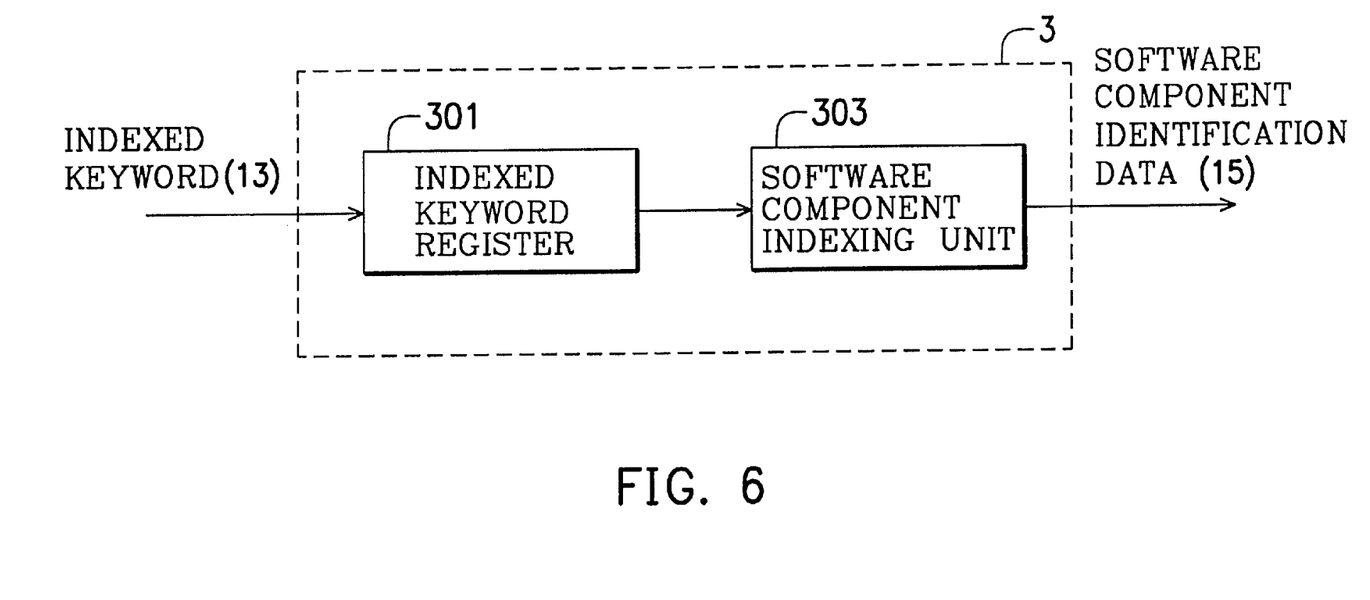
FIG. 6 is a block diagram illustrating the functional structure of the information indexing block of the embodiment of this invention.

FIG. 6 is a block diagram illustrating the functional structure of the information-indexing block of the embodiment of this invention. As shown in the figure, the information procedure 3 comprises an index keyword register section 301 and software component indexing unit 303 for generating corresponding ID 15 for software components that meet some requirements based on the indexed keyword 13 supplied by the synonym block 1.

As described above in this embodiment, there are four query items for operators to enter, namely: function of software components, associated medium, file type of software components and system type, as shown in FIG. 2. Therein, only the input for function of software components can be freely set to generate several relevant indexed keywords 13 after the processing in the synonym block 1; other index items can be selected with one of keywords provided by the system. The indexed keywords 13 (only those corresponding to the function of software components) found by the synonym block 1 are sequentially selected and the-keywords from the four query items are combined to form a set of actual query information, which are then supplied to and saved in the indexed keyword register 301, respectively. Next, each keyword stored in the indexed keyword register 301 is supplied to the software component indexing unit 303 for matching so as to find an appropriate software component, then the identification data for those software components are outputted to complete the function of software component retrieval. The above process continues until all indexed keywords are completely searched.

Figure 7:
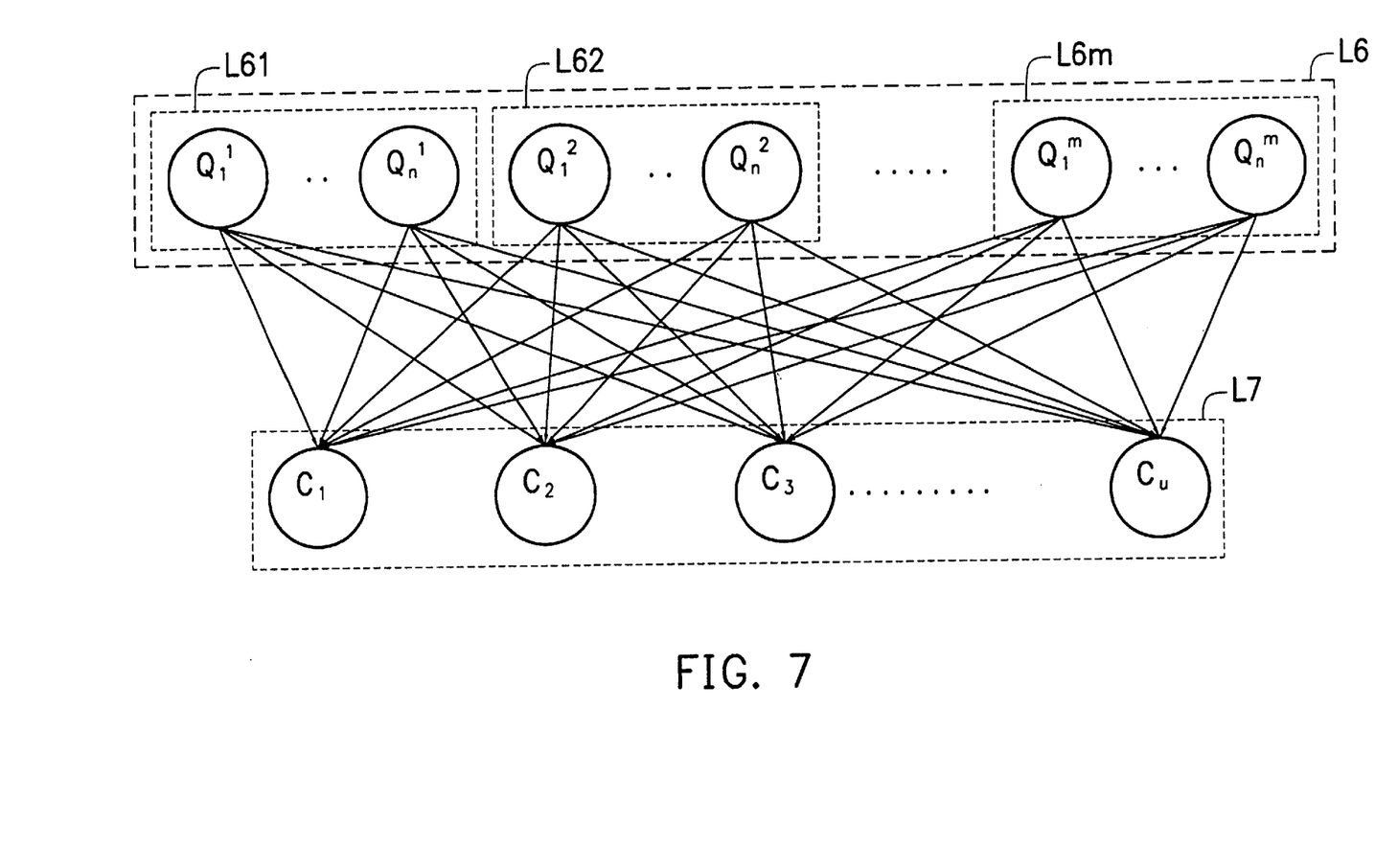
FIG. 7 is a diagram illustrating the detailed structure of an actualized information indexing block with the structure of the fuzzy neural network of the embodiment of this invention

FIG. 7 is a diagram illustrating the detailed structure of an actualized information indexing block with the structure of the fuzzy neural network of the embodiment of this invention. The fuzzy neural network for actualizing this information indexing block 3 consists of two layers, L6 and L7, corresponding to the indexed keyword register 301 and software component indexing unit 303, respectively. The function of each node of layers L6 and L7 is described as follows.

Layer L6

Layer L6 is composed of m sublayers designated respectively as L61, L62, _, L6m, and each sublayer has n nodes. For example, sublayer L61 comprises n nodes from $Q_1^1$ to $Q_n^1$, and sublayer L6m comprises n nodes from $Q_1^m$ to $Q_n^m$ and so on. Each sublayer is for storing a keyword for each query keyword set, hence, m represents the keyword included in each set of query words (m is 4 in this embodiment), and whereas n represents the maximal number of letters for the query word (n is 21) in this embodiment.

In other words, in this embodiment, the nodes $Q_1^1$ to $Q_{21}^1$ of sublayer L61 are for storing the keywords for the function of software components and the keywords are sequentially set by the indexed keywords found with the synonym block 1. The nodes $Q_1^2$ to $Q_{21}^2$ of sublayer L62 are for storing the keywords for associated medium. The nodes $Q_1^3$ to $Q_{21}^3$ of sublayer L63 are for storing the keywords for software file type. The nodes $Q_1^4$ to $Q_{21}^4$ of sublayer L64 are for storing the keywords for system type. In this embodiment, the latter three keywords are selected from the keywords predefined by the system.

Layer L7

Layer L7 consists of u nodes, designated as $C_1, C_2, C_3, \_, C_u$, respectively. Each node of layer L7 corresponds to each individual software component set in the system. Software component keywords describing the corresponding software components and the identification data corresponding to the software components are saved respectively in nodes of layer L7. Therein, software component keywords containing the keywords for the four query items with their values inputted by nodes of layer L6 when the nodes of layer L7 are created. The ID number indicates the location of the software component in the software libraries or the location of retrieval in the Internet.

Each node of layer L7 receives a keyword supplied by each individual node of layer L6 for matching with the software component keywords, if they meet the requirements, their corresponding identification data are outputted. The action of each node of layer L7 can be represented in the following equation:

$$d(\overline{Q}, \overline{C}_i) = \sum_m A_m \quad (16)$$

$$A_m = \begin{cases} \tilde{W}^m \mu_k & \text{if } \overline{K}^m \neq \overline{0} \text{ and } \overline{K}^m \neq \overline{C}_i^m \\ 0 & \text{if } \overline{K}^m = \overline{0} \\ \tilde{W}_i^k (1 - \mu_k) & \text{otherwise} \end{cases} \quad (17)$$

$$\mu(\overline{Q}, \overline{C}_i) = 2*(1+(d(\overline{Q},\overline{C}_i)/F_d)^{Fe})^{-1} \quad (18)$$

$$O(C_i) = \begin{cases} L_C(C_i) & \text{if } \mu(\overline{Q}, \overline{C}_i) \geq \theta_4 \\ \text{Null,} & \text{otherwise} \end{cases} \quad (19)$$

Equation (16) is used for calculating the distance between the keyword set $\overline{Q}$ (composed of four keywords) being entered and the software component keyword set $\overline{C}_i$ of the $i^{th}$ software component described and saved by the $i^{th}$ node. In this embodiment, $\overline{Q}$ includes four vectors (1~m) and each vector includes 21 elements (1~n. Similarly, $C_i$ also includes four vectors and each vector includes 21 elements. In addition, the value A represents the distance of a vector (one of the 1~m) and is calculated with equation (17).

In equation (17), the distance between a vector $\overline{Q}$ of the input keywords and the corresponding vectors $A_m$ of the encoded pattern $C_i$ of software component is calculated. Particularly, only portions of query items (vectors) with actual input keywords in the input keywords $\overline{Q}$ are calculated; the distance $A_m$ for query words with no input is set to 0. In this manner, the processing can be smoothly performed in this embodiment even when the operator is uncertain of a certain keyword for querying (for example, unsure of system type). That is, fuzzy input retrieval can be realized. Therein, $\tilde{W}^m$ represents the weight of the $m^{th}$ vector (that is, query item) of the input keyword set $\overline{Q}$ and indicates the importance of the vector among all vectors in the input keyword set.

Equation 18 is used for calculating the similarity value between the input keyword set $\overline{Q}$ and the software component keyword set $\overline{C}_i$ of the originally saved in node $C_i$. Therein, Fd' and Fe' are fuzzifiers for describing the range covered by the membership function and the sensitivity in relation to distance between the input keyword set $\overline{Q}$ and the software component keyword set $\overline{C}_i$ saved in the node. The similarity value calculated with equation 18 can be supplied not only to the L7 node for determining whether the identification data of the corresponding software component can be outputted, but also to the component ranking-filtering block 5 for determining the order of ranking for the retrieved software components.

Equation 19 is used for determining whether the software component corresponding to L7 node is retrieved. That means, if the similarity value $\mu(\overline{Q},\overline{C}_i)$ between the input keyword set $\overline{Q}$ and the software keyword set $\overline{C}_i$ describing the software component has exceeded a predetermined threshold $\theta_4$, then the identification data $L_c(C_i)$ for the software component is determined to be outputted, its corresponding similarity value is also outputted to the component ranking-filtering block 5 for further processing.

The setting of the threshold $\theta_4$ of L7 nodes will now be described.

When starting to use the information retrieval system of this invention, the operator will be prompted to enter various query items as displayed on the query screen shown in FIG. 2 for indexing software component libraries. The query word input methods as adopted in this embodiment can be one to be freely entered by the operator as in function of software components 62 or another to be selected by the operator from the pop-up menu, such as associated medium 64, software file type 66 and system type 68. If software component function 62 is selected for direct input, the operator can key in multiple query words with each of the query words being separated by a slash. Query words in the query items will be processed one after another by the system. Each individual result will finally be combined and processed. If query words are selected from the pop-up menu, only one query item will be selected each time, since options are individually independent and mutually exclusive. Besides, only software component function 62 will undergo processing in the synonym block 1 to obtain numerous keywords. In all other query items that do not require synonymy processing, the query word selected by the operator is the default keyword. Each time in the information index block 3, a keyword is selected from each query item to form a set of keywords for component retrieval processing.

There are three possible outcomes when all the software components found by the information index block 3 are presented to the operator for selection. First, the operator may find the appropriate software component immediately from a fair number of the retrieved software component. Second, the operator may find it difficult to select a software component from a massive number of the retrieved software components. Third, the operator may not find the appropriate software component from a limited number of software components. The problems with the last two outcomes can be resolved by resetting the threshold $\theta_4$ of the L7 nodes in the component ranking-filtering block 5. When the number of software components becomes excessive, the threshold $\theta_4$ is reset higher. That is, the threshold $\theta_4$ for controlling the output of software components can be reset higher to reduce the number of software components for output when the number of the outputted software components becomes excessive. Conversely, the threshold $\theta_4$ can be reset lower when the number of the software components becomes too limited so that the operator may have more software components to choose from.

From the above description of information index block 3, it becomes evident that the information (software component) retrieval system of this embodiment can perform retrieval in a fuzzy retrieval manner in response to the query words the operator has entered. That is, even when the operator can not describe the exact content for a query item, this information retrieval system can still find all possible software components in a most approximate manner.

Component ranking-filtering block (5)

The component ranking-filtering block 5 filters the amount of the retrieved software component based on the threshold $\theta_4$ or determines the ranking order of various software components based on the corresponding similarity value supplied by the information index block 3. In other words, the greater the similarity value, the more approximate the input query word to the keyword describing the software component.

Customizable ranking-filtering adjusting section 7 can adjust the ranking mechanism and the filtering mechanism of the component ranking-filtering block 5 according to the software component the operator actually selects to adjust to suit personal habit and retrieval preference.

According to the above description, the software component retrieval system of this embodiment provides the following advantages of:

Firstly, enabling the operator to customize the thesaurus for easy querying according to personal habit and preference;

Secondly, tolerating input errors;

Thirdly, performing and processing indefinite information, that is, providing methods of fuzzy querying; and Fourthly, ranking the retrieved software component and filtering out those low in correlation according to operator's personal retrieval preference and habit for convenience in selection.

It should be understood that this invention is not limited to the preferred embodiment as disclosed above. Variations and modifications can be made by those who are skillful in the art without departing from the spirit and scope of the present invention as defined in the appended claims.

What is claimed is:

1. An information retrieval system for finding corresponding information components according to an entered query word, comprising:

a synonym block for finding indexed keywords according to the query word;

an information indexing block for finding a corresponding information component based on the indexed keywords; and a component ranking-filtering block for ranking and filtering the found information components and for outputting the information components for selection;

wherein the synonym block comprises:

encoding means for encoding the query word and generating an encoded pattern of the query word, the encoded pattern of the query word corresponding to a feature of the query word;

similarity means for comparing the encoded pattern of the query word with the encoded patterns of system synonyms, the latter generated by encoding a plurality of system synonyms, and generating corresponding similarity values, the similarity values representing the similarity between the query word and the system synonyms, each of the system synonyms corresponding to at least one of the system keywords, respectively; and correlation means for selecting the indexed keywords from the system keywords according to correlation values between the system synonyms and the system keywords, the similarity values generated by the similarity means and a predetermined threshold value for comparison.

2. The information retrieval system as claimed in claim 1, wherein the information components are software components classified by types, functions, associated storage media and operating platforms.

3. The information retrieval system as claimed in claim 1, wherein the similarity means comprises:

a plurality of similarity-calculating units for respectively storing the encoded patterns of the system synonyms corresponding to the system synonyms, receiving the encoded pattern of the query word, and calculating the corresponding similarity values according to a similarity-calculating function.

4. The information retrieval system as claimed in claim 1, wherein the correlation means comprises:

a plurality of correlation units, corresponding to the system keywords, respectively, for receiving the similarity values generated by the similarity means and comparing the predetermined threshold value with the combination of the correlation values and the similarity values, and determining whether the corresponding system keywords serve as the indexed keywords.

5. The information retrieval system as claimed in claim 1, wherein the encoding means encodes the query word into the corresponding encoded pattern of the query word by recording the occurrences of the alphabetical letters in the query word, the location of the first occurrence for each of the alphabetical letters and a portion of the query word.

6. The information retrieval system as claimed in claim 5, wherein the synonym block further comprises a shifting means for calculating the position shift amount of each alphabetical letter by the location of the first occurrence of each alphabetical letter to determine whether there is any input error, and compensating the query word when there is an input error.

7. An information retrieval system for finding corresponding information components according to an entered query word, comprising:

a synonym block for finding indexed keywords corresponding to the query word;

an information indexing block for finding a corresponding information component based on the indexed keywords; and a component ranking-filtering block for ranking and filtering the found information components and for outputting the information components for selection;

wherein the synonym block comprises:

encoding means for encoding the query word and a keyword for the found information components and generating an encoded pattern of the query word and an encoded pattern of the keyword for the found information components, the encoded pattern of the query word corresponding to a feature of the query word, the encoded pattern of the keyword for the found information components corresponding to a feature of the keyword for the found information components;

similarity means for respectively comparing the encoded pattern of the query word and the encoded pattern of the keyword for the found information components with encoded patterns of system synonyms, the latter generated by encoding a plurality of system synonyms, and generating a first set of similarity values and a second set of similarity values, the first set of the similarity values representing the similarity between the query word and the system synonyms, the second set of the similarity values representing the similarity between the keyword for the found information components and the system synonyms, each of the system synonyms corresponding to at least one of the system keywords, respectively;

correlation means for calculating an output value according to the first set of the similarity values, the second set of the similarity values and original correlation values between the system synonyms and the system keywords; and determining means for determining whether the similarity means and the correlation means need adjustment according to the first set of the similarity values, the second set of the similarity values and the output value.

8. The information retrieval system as claimed in claim 7, further comprising an adjusting means for adjusting the similarity means and the correlation means according to the output value generated by the determining means.

9. The information retrieval system as claimed in claim 7, wherein the information components are software components classified by types, functions, associated storage media and operating platforms.

10. The information retrieval system as claimed in claim 7, wherein the similarity means comprises:
a plurality of similarity-calculating units for respectively storing the encoded patterns of the system synonyms corresponding to the system synonyms and receiving the encoded pattern of the query word and the encoded pattern of the keyword for the found information components, to calculate the first set of the similarity values and the second set of the similarity values.

11. The information retrieval system as claimed in claim 8, wherein the determining means comprises a first selection means for comparing a first threshold value with the maximal of the first set of the similarity values and the maximal of the second set to decide an adjustment procedure pertaining to the similarity means and the correlation means.

12. The information retrieval system as claimed in claim 8, wherein the determining means comprises a second selection means for comparing a second threshold value with the maximal of the output values to decide an adjustment procedure pertaining to the similarity means and the correlation means.

13. The information retrieval system as claimed in claim 7, wherein the encoding means encodes the query word and the keyword for the found information components into the corresponding encoded patterns by recording the occurrences of the alphabetical letters in the query word and the keyword for the found information components, the location of the first occurrence for each of the alphabetical letters and a portion of the query word and the keyword for the found information components.

14. The information retrieval system as claimed in claim 13, wherein the synonym block further comprises a shifting means for calculating the position shift amount of each alphabetical letter by the location of the first occurrence of each alphabetical letter to determine whether there is any input error, and compensating the query word when there is an input error.

15. An information retrieval system for finding corresponding information components according to an entered query word, comprising:
a synonym block for finding indexed keywords according to the query word;
an information indexing block for finding a corresponding information component based on the indexed keywords; and
a component ranking-filtering block for ranking and filtering the found information components and for outputting the information components for selection;
wherein the information indexing block comprises:
storing means for sequentially storing the indexed keywords; and
a plurality of indexing units, respectively corresponding to the information components and storing a component keyword set and identification data pertaining to the corresponding information components, for calculating a similarity value between the component keyword set and the received indexed keywords and outputting the identification data pertaining to the corresponding information component when the similarity value exceeds a predetermined threshold value.

16. The information retrieval system as claimed in claim 15, wherein the information components are software components classified by types, functions, associated storage media and operating platforms.

17. The information retrieval system as claimed in claim 15, wherein the predetermined threshold value is adjustable and the adjusted threshold value is used to decide the number of the outputted identification data pertaining to the corresponding information components.

18. An information retrieval system for finding corresponding information components according to an entered query word, comprising:
a synonym block for finding indexed keywords responsive to the query word according to a fuzzy synonym procedure;
an information-indexing block for finding a corresponding information component based on the indexed keywords;
a component ranking-filtering block for ranking and filtering the found information components and for outputting the information components for selection according to a fuzzy ranking-filtering procedure;
a synonym adjusting block for adjusting the fuzzy synonym procedure of the synonym block according to the found information components; and
a ranking-filtering adjusting block for adjusting the fuzzy ranking-filtering procedure of the component ranking-filtering block according to the found information components.

19. The information retrieval system as claimed in claim 18, wherein the information components are software components classified by types, functions, associated storage media and operating platforms.

20. The information retrieval system as claimed in claim 18, wherein the synonym block is implemented by a fuzzy neural network for accelerating parallel processing.

21. The information retrieval system as claimed in claim 18, wherein the information-indexing block is implemented by a fuzzy neural network for accelerating parallel processing.

22. The information retrieval system as claimed in claim 18, wherein the synonym block comprises encoding means for encoding the query word into an encoded pattern by recording the occurrences of the alphabetical letters in the query word, the location of the first occurrence for each of the alphabetical letters and a portion of the query word; and shifting means for calculating the position shift amount of each alphabetical letter by the location of the first occurrence of each alphabetical letter to determine whether there is any input error and compensating the query word when there is an input error.

* * * * *